United States Patent [19]
Yamabe

[11] Patent Number: 5,952,916
[45] Date of Patent: Sep. 14, 1999

[54] HAMMER-EQUIPPED EMERGENCY SIGNAL DEVICE

[75] Inventor: Hideyasu Yamabe, Osaka, Japan

[73] Assignee: Atras Auto Co., Ltd, Osaka-fu, Japan

[21] Appl. No.: 09/213,964

[22] Filed: Dec. 17, 1998

[51] Int. Cl.⁶ .................................................. B60Q 1/26
[52] U.S. Cl. .......................... 340/468; 340/321; 340/331
[58] Field of Search ..................... 340/321, 332, 340/331; 81/20; 30/123; 224/27; 241/190; 299/31; 145/36

[56] References Cited

U.S. PATENT DOCUMENTS

| | | | |
|---|---|---|---|
| 3,772,781 | 11/1973 | Newman | 30/123 |
| 3,930,525 | 1/1976 | Stoneburner | 145/36 |
| 4,545,440 | 10/1985 | Treadway | 173/132 |
| 4,906,049 | 3/1990 | Anderson | 299/31 |
| 5,562,257 | 10/1996 | Graveman | 241/190 |
| 5,860,334 | 1/1999 | Douglas | 81/20 |

*Primary Examiner*—Jeffery A. Hofsass
*Assistant Examiner*—Daryl C. Pope
*Attorney, Agent, or Firm*—Reising, Ethington, Barnes, Kisselle, Learman & McCulloch, PC

[57] ABSTRACT

An arrangement comprising a main body having a head continuous with a grip, an LED housed in the main body for emitting warning light from within the grip, a light bulb housed in the main body for emitting warning light through glass disposed in at the front end of the head, a light emission controller for controlling the emission of light from the LED and light bulb, and a percussion imparting member attached to the head for breaking a window glass in a car. This arrangement makes it unnecessary to secure a space for installing both a hammer and an emergency signal instrument in a car.

39 Claims, 17 Drawing Sheets

HAMMER-EQUIPPED EMERGENCY SIGNAL DEVICE

TECHNICAL FIELD

This invention relates to a hammer-equipped emergency signal device adapted to be installed chiefly in a car, for use in an emergency such as a traffic accident.

BACKGROUND OF THE INVENTION

Heretofore, there have been hammer devices used for breaking a window glass in a car to evacuate the car in an emergency such as a traffic accident, and from a viewpoint of frequent traffic accidents, it has been considered important to install this type of hammer device in a car. On the other hand, there are cases where it is compulsory to install emergency signal instrument in a car.

However, it is difficult to secure a space in a car for installing both a hammer device and an emergency signal instrument, and even if such installation space is secured, this creates inconvenience in that separate holders have to be provided.

Accordingly, the invention is intended to provide a hammer-equipped emergency signal device which is capable of solving said problem.

DISCLOSURE OF THE INVENTION

The present invention provides an arrangement comprising a hollow main body which has a grip having an elliptic cross section and an enlarged head having a circular cross section continuous with said grip, at least the grip of said main body being made of light-permeable material, a first light emitting body housed in said grip for emitting warning light from within and through said grip, a second light emitting body housed in said head for emitting warning light through a disk-like light-permeable plate disposed in the front end of the head, a light emitting circuit housed in said main body and equipped with a light emission controller for controlling the emission of light from said first and second light emitting bodies and a battery disposed in the grip, a control switch body disposed in said main body and adapted to turn off or on said light emitting circuit when the main body is placed in or removed from a holder provided in a car, magnets disposed around the outer periphery of the front end surface of said head, the outer periphery of said head serving as a hammer portion for breaking glass in the car, said hammer portion having a percussion imparting member attached thereto and protruding in the longer diameter direction of the grip, and a cutter for cutting a seat belt, disposed at a position continuous with said grip and head and extending in the shorter diameter direction of the grip.

Further, according to the invention, the main body includes an alarm buzzer for sounding an alarm in correspondence to the operation of the control switch body.

Further, according to the invention, the color of the light emitted from said first light emitting body is red, and the cutting edge of said cutter is curved such that it is recessed toward the head.

Further, the invention provides an arrangement, comprising a hollow main body which has a grip having an elliptic cross section and an enlarged head having a circular cross section continuous with said grip, at least the grip of said main body being made of light-permeable material, first light emitting bodies housed in said grip at predetermined intervals longitudinally of the grip for emitting warning light from within and through said grip, a second light emitting body housed in said head for emitting warning light through a disk-like light-permeable plate disposed in the front end of the head, a light emitting circuit housed in said main body and equipped with a light emission controller for controlling the emission of light from said first and second light emitting bodies and a battery disposed in the grip, a control switch body disposed in said main body and adapted to turn off or on said light emitting circuit when the main body is placed in or removed from a holder provided in the car, magnets disposed around the outer periphery of the front end surface of said head, the outer periphery of said head serving as a hammer portion for breaking glass in the car, said hammer portion having attached thereto a percussion imparting member protruding in the longer diameter direction of the grip, and a cutter for cutting a seat belt, disposed at a position continuous with said grip and head and extending in the shorter diameter direction of the grip.

Further, according to the invention, a reflecting member is housed in the grip whereby the warning light emitted from the first light emitting body is reflected in the shorter diameter direction of the grip.

According to the above arrangement, placing the main body in a holder installed in a car results in the control switch body being pressed by the holder to turn off the light emitting circuit, the first and second light emitting bodies for emitting warning light being extinguished, whereas removing the main body from the holder results in the control switch body turning on the light emitting circuit, the emission of light from the light emitting bodies being controlled by the light emission controller, effecting the emission of warning light and the sounding of an alarm from the alarm buzzer.

In use, a driver or other person grips the grip having an elliptic cross section and breaks a window glass of the car by the percussion imparting member provided in the head having a circular cross section so as to escape out of the car. Further, when the head is placed on the car body, its position is magnetically maintained by the magnet and the emission of warning light from the first light emitting body reports the emergency stoppage of the car to others. Further, in an emergency when the driver cannot unfasten his seat belt, he may cut the seat belt with the cutter and escape out of the car.

Since at least the grip of the main body is made of light-permeable material and the reflecting member is housed in the grip in order to reflect the warning light emitted from the first light emitting body in the shorter diameter direction of the grip, the warning light is conspicuous as it is emitted in both of the longer and shorter diameter directions of the grip.

Further, the invention provides an arrangement comprising a hollow main body which has a grip having an elliptic cross section and an enlarged head having a circular cross section continuous with said grip, said main body being made of colored light-permeable material, a first light emitting body for emitting warning light from within and through said grip, a second light emitting body for emitting warning light through a glass disk disposed in the front end of the head, said first and second light emitting bodies being housed in said main body on the side associated with the head, a light emitting circuit equipped with a light emission controller for controlling the emission of light from said first and second light emitting bodies and a battery disposed in the grip, a control switch body disposed in said grip to protrude therefrom and adapted to turn off or on a light emitting circuit when the main body is placed in or removed from a holder provided in a car, an annular magnet attached along the outer periphery of the front end of said head, a hammer body attached somewhere between the ends of the head and having a percussion imparting member protruding in the longer diameter direction of the grip for breaking a window glass in a car, and a cutter for cutting a seat belt, disposed somewhere between the ends of the head to extend in the shorter diameter direction of the grip.

Further, the main body is composed of a split body which can be split into two halves in the longer diameter direction of the grip, while the hammer body is composed of mutually complementary segments in the form of an annular member and a percussion imparting member which are disposed in the head of the main body, said segments being split in the same direction as said main body, each segment having a joining piece for joining to the joining surface of the adjoining segment, the arrangement being such that the hemmer body is held between the two halves of the split body with said joining surfaces put together.

According to the above arrangement when the driver places the main body in a holder provided in the car, the control switch body is pressed by the holder to turn off the light emitting circuit, the first and second light emitting bodies for emitting warning light are brought into the extinguished state, whereas when the main body is removed from the holder, the control switch body turns on the light emitting circuit and the light emission controller controls the emission of light from the light emitting bodies so that emission of warning light is effected.

And the driver grips the grip having an elliptic cross section and breaks a window glass in the car with the percussion imparting member provided on the head having a circular cross section so as to escape out of the car. Further, when the head is placed on the car body, its position is magnetically maintained by the magnet, and the emission of warning light makes it possible to report the emergency stoppage to other persons. In the case of emergency where the driver cannot release his seat belt, he may cut the seat belt with the cutter to escape out of the car.

PREFERRED EMBODIMENTS

Hammer-equipped emergency signal devices according to preferred embodiments of the invention will now be described with reference to the drawings. First, a first embodiment of the invention will be described with reference to FIGS. 1 through 8.

Figure 1:
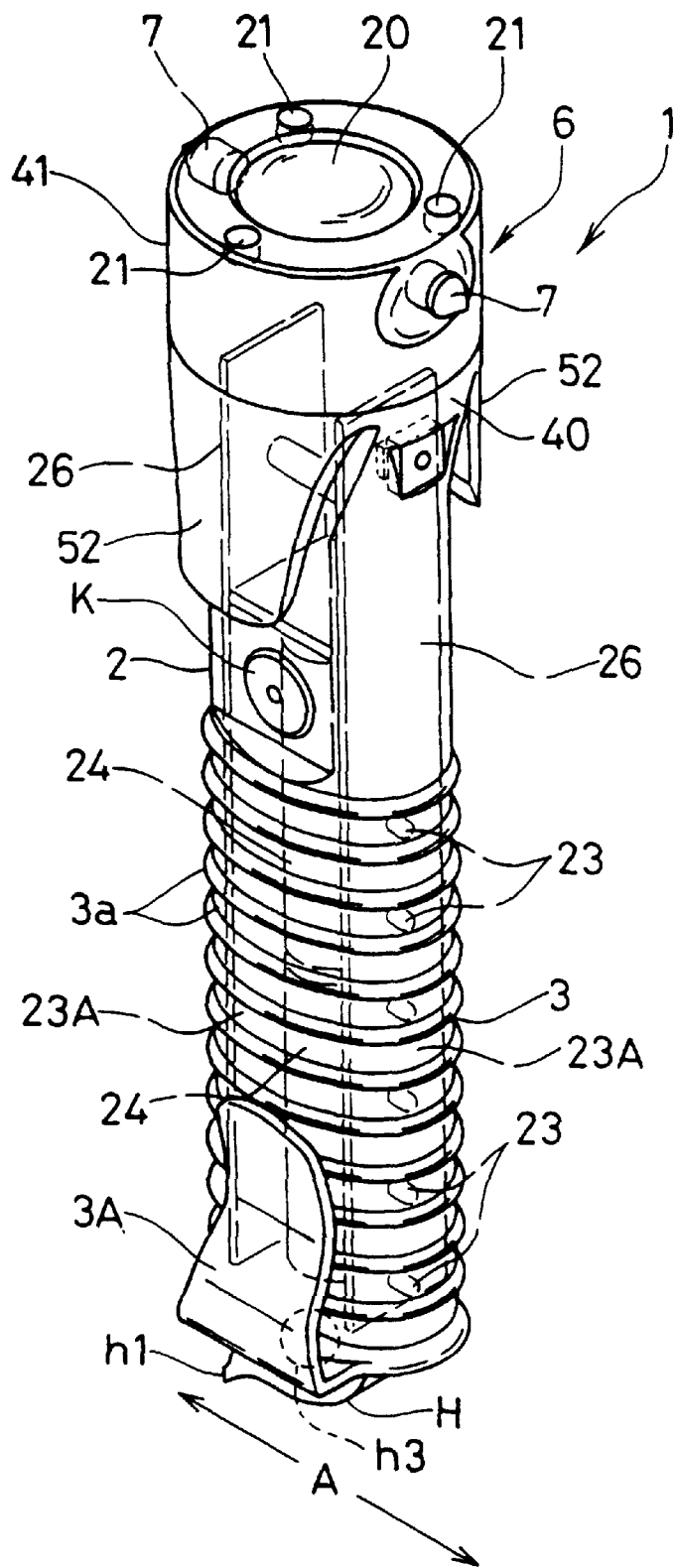
FIG. 1 is an overall perspective view of a hammer-equipped emergency signal device as seen from the head side thereof, according to a first embodiment of the present invention.
Figure 2:
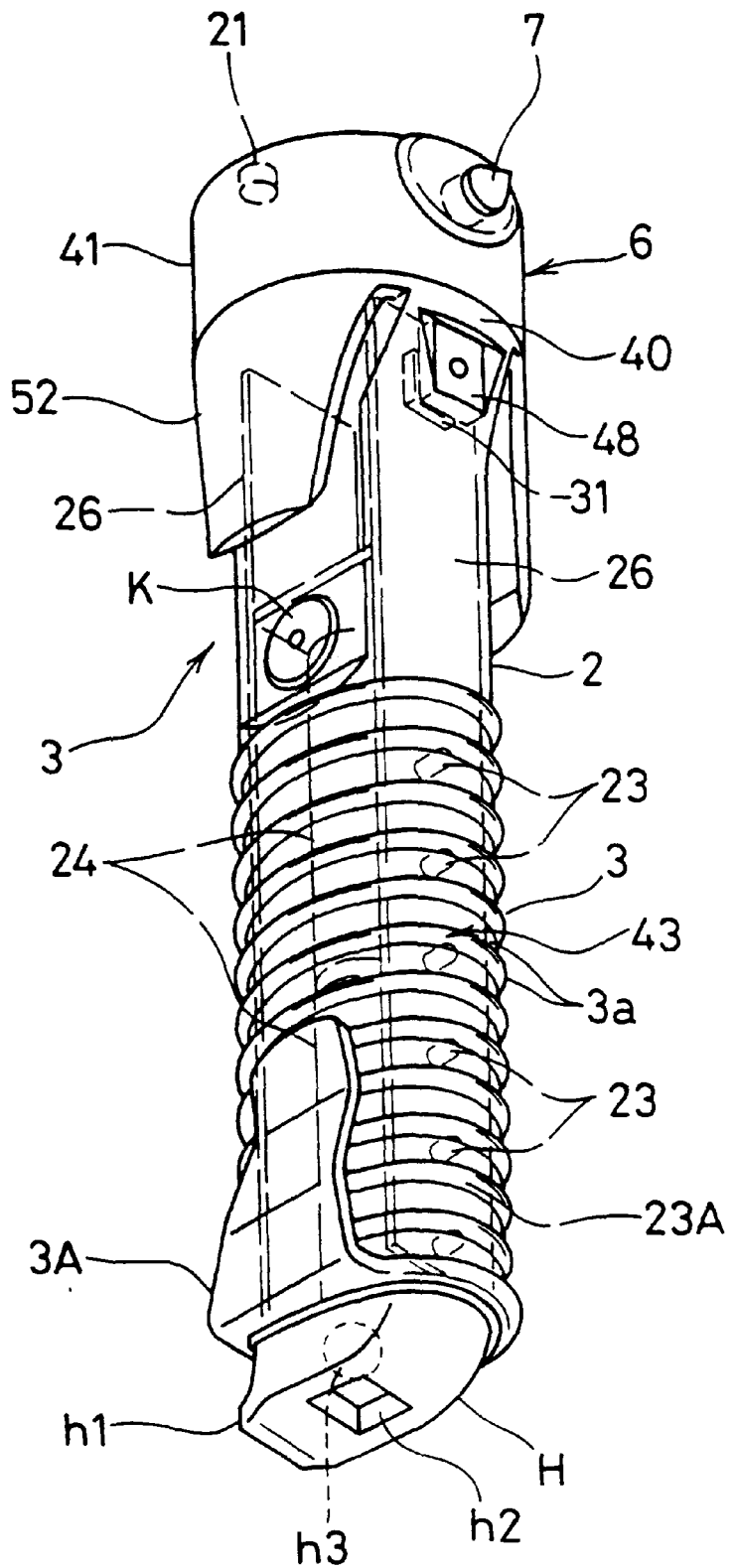
FIG. 2 is an overall perspective view of said signal device as seen from the grip side thereof.

A hammer-equipped emergency signal device 1 according to the first embodiment of the invention, as shown in perspective views in FIGS. 1 and 2, comprises a hollow main body 2 having a grip 3 having an elliptic cross section and a head 6 of circular (annular,) cross section which is continuous with said grip 3 and increased in size. And said grip 3 is formed with irregularities 3a on its surface for easy gripping, and the main body 2 is made of transparent synthetic resin.

Figure 5:
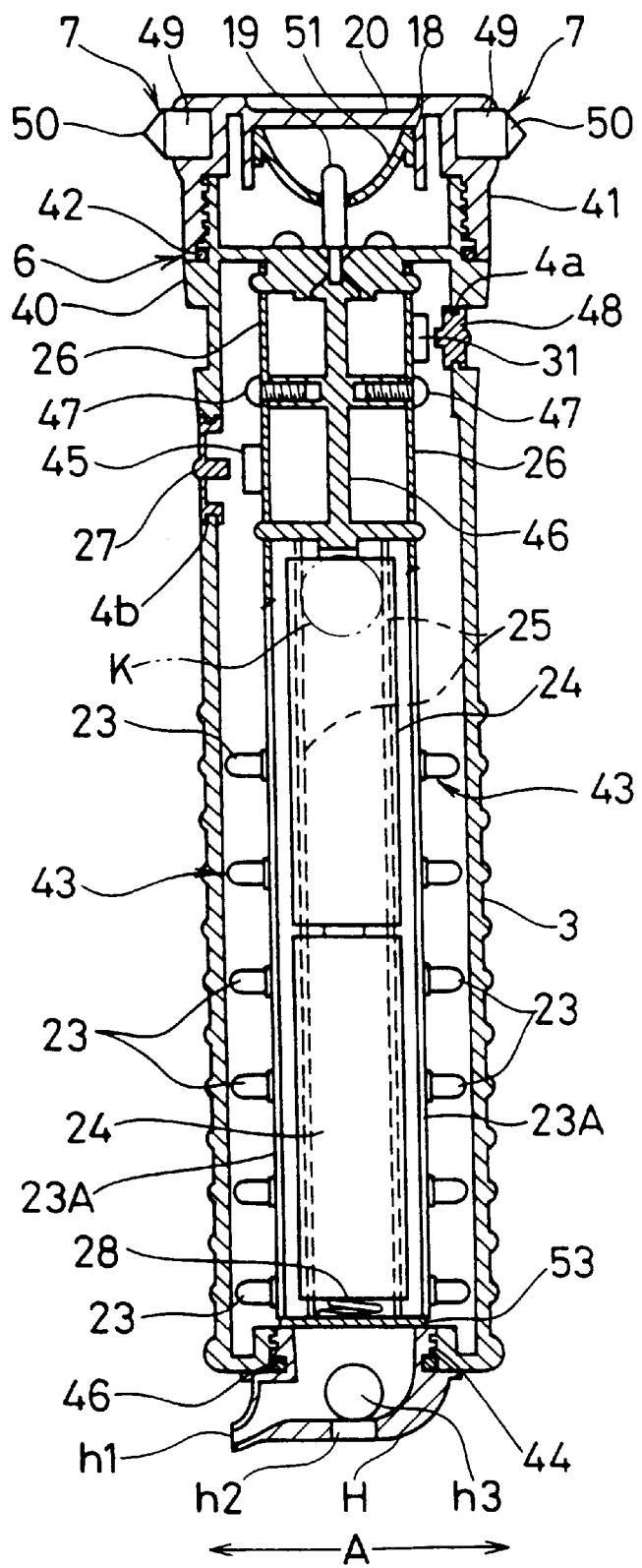
FIG. 5 is a central sectional view of said signal device in FIG. 3.

The head 6 comprises a diametrically increased portion 40 slightly increased in diameter than the grip 3, and a cap 41 having a thread formed on its inner peripheral surface adapted for engagement with the thread formed on the outer periphery of the front end portion of said diametrically increased portion 40 and, as shown in a sectional view in FIG. 5, a sealing ring 42 is fitted on the diametrically increased portion 40 somewhere between the ends thereof.

The end of said grip 3 is formed with an internally threaded opening 44 and an externally threaded lid member H is removably attached to said opening 44, said lid member H having a sealing ring 46 fitted thereon. Attached to said lid member H are a metal plate 53 connected to base plates 23A to be later described and a metal spring 28 which presses batteries 24 (for example, two series-connected dry cells are used). This lid member H is also used as a warning horn (whistle) and has a blow-in hole h1, a blowout hole h2 and a sounding ball h3 provided inside thereof.

Further, one side of the grip 3 is integrally formed with a hook member 3A (which is transparent in like manner as the main body 2) used for example for hanging the signal device on a shoulder string of a uniform for a guard or storing the signal device in a predetermined space.

Figure 3:
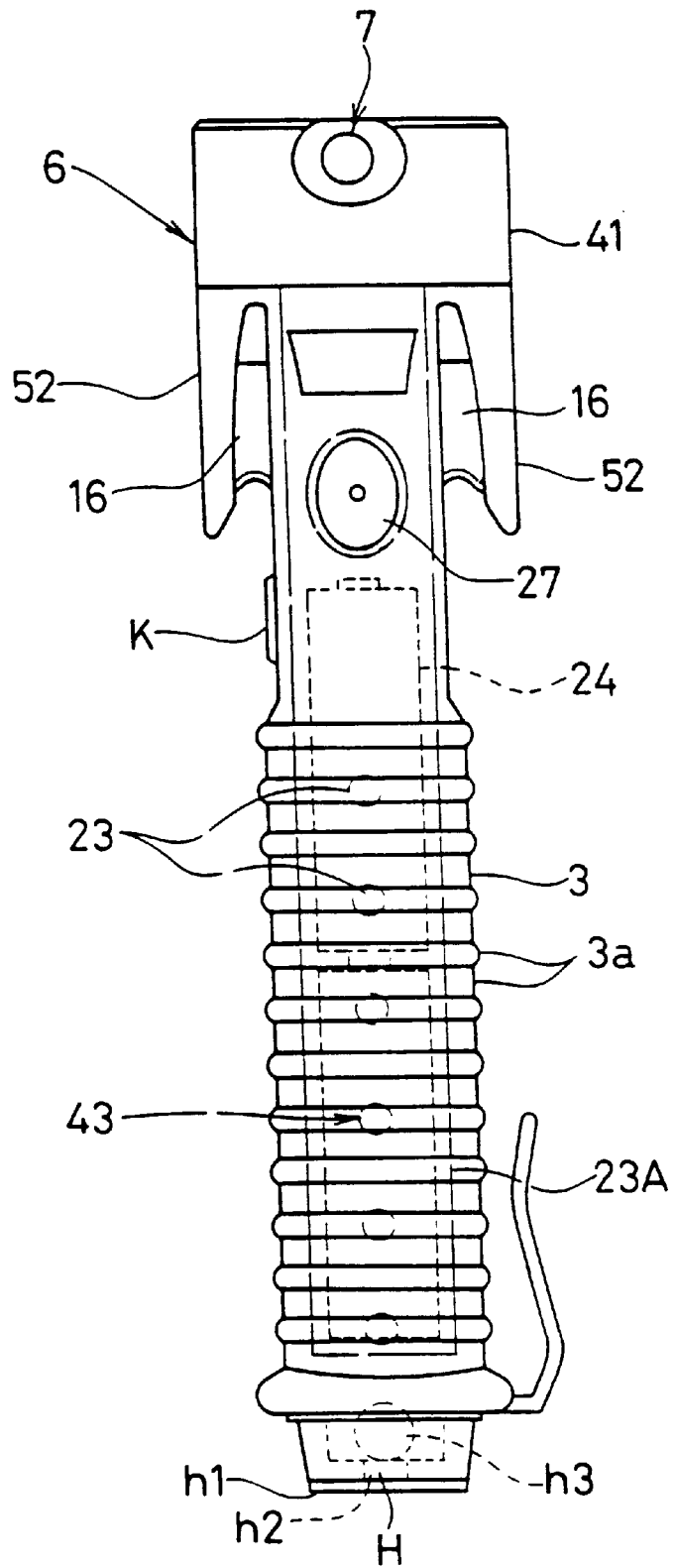
FIG. 3 is an overall front view of said signal device.
Figure 4:
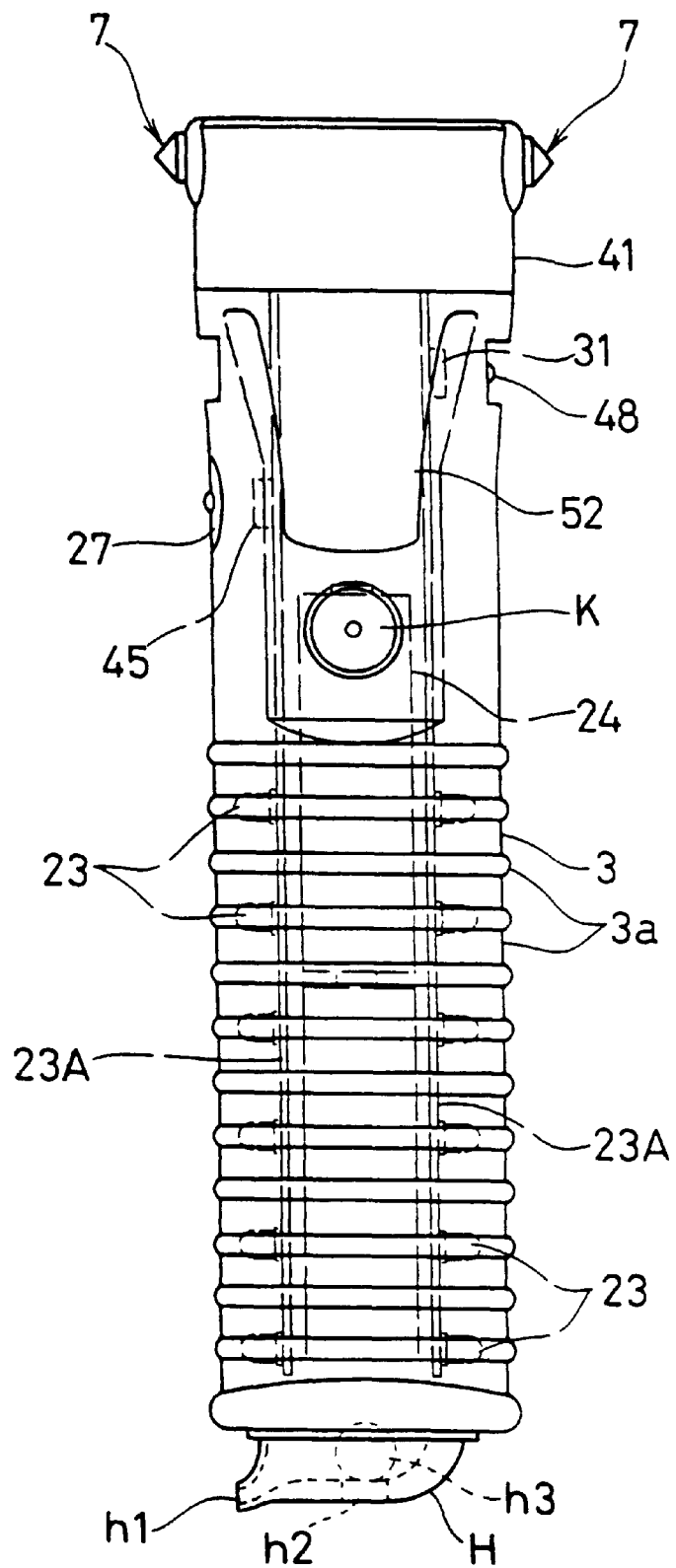
FIG. 4 is an overall side view of said signal device.

The grip 3 has a pair of LED groups 43 housed therein, each consisting of a plurality of LEDs (an example of a first light emitting body) 23 which emits red warning light outwardly of the main body 2 from within the grip 3, the LEDs 23 in each LED group 43 being arranged at predetermined intervals longitudinally of the grip 3 on said base plate 23A which is visible from outside the grip 3 (in the figure, six LEDs are arranged on each side). And as shown in FIGS. 3 through 5, the LEDs 23 are positioned such that the light emitting portions of their heads are opposed to the ridges in said irregularities 3a.

Further, between the base plates 23A, the inner surface of the grip 3 is integrally formed with a battery case 25 for holding the batteries 24.

Housed in said head 6 is a white light bulb (an example of a second light emitting body) 19 which emits warning light through a glans disk (an example of a light-permeable plate) 20 disposed at the front end of said head 6. Disposed on the side of the battery case 25 associated with the head 6 are light emission controllers (control base plates) 26 for controlling the emission of light from the light bulb 19 and said LEDs 23 on both sides, said light emission controllers 26 being attached to an attaching plate 46 centrally disposed inside the main body 2 by means of setscrews 47.

Further, an alarm buzzer is attached to the side of the grip 3 such that the alarm buzzer K is connected to said light emission controllers 26 which are also used for controlling this alarm buzzer K. In addition, this alarm buzzer K is of a small-size piezoelectric type using ceramic as piezoelectric element of which sound pressure is set, for example, to 110 db (decibel).

Figure 7:
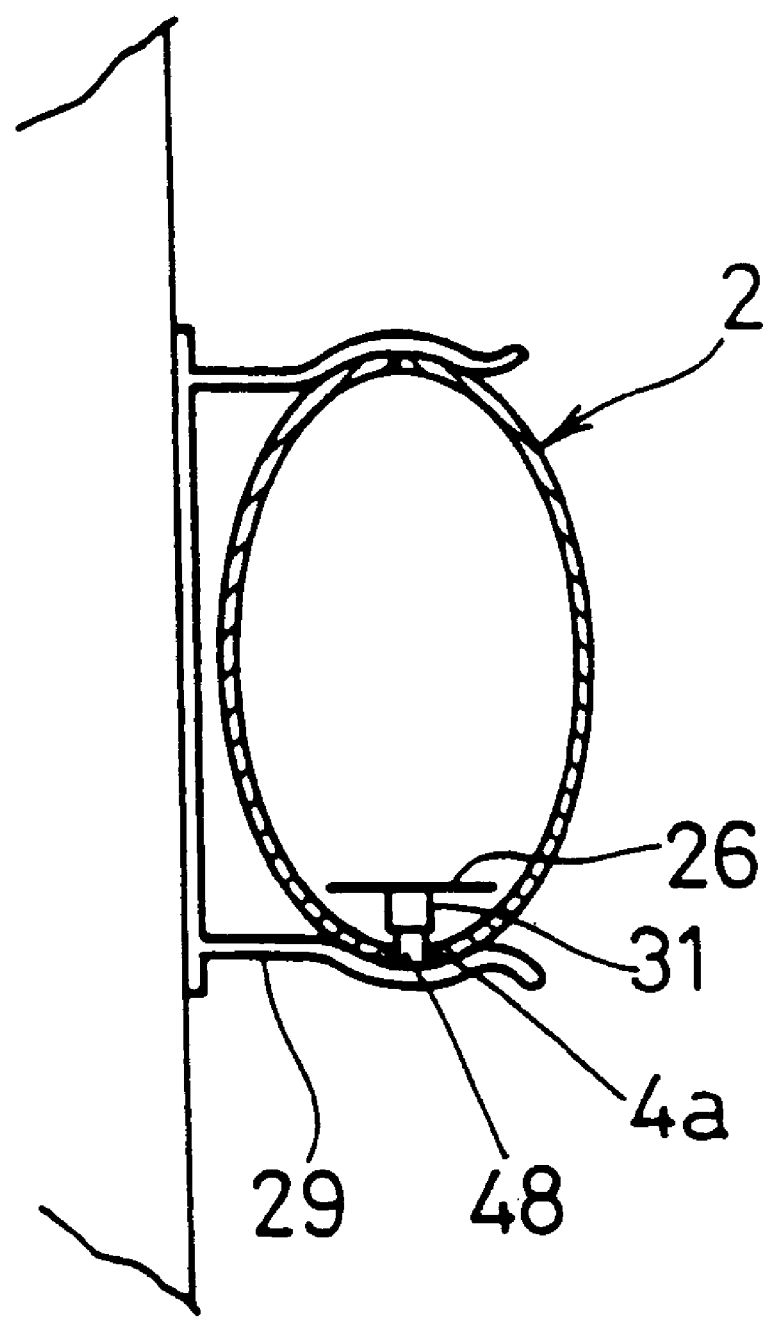
FIG. 7 is a schematic sectional view of said signal device installed on a holder.

Further, at one side of the grip 3 associated with the head 6, there is a press member 48 which is pressed when the main body 2 is installed in a holder 29 disposed inside a car shown in FIG. 7. The press member 48 is attached to the main body 2 through a protrusion hole 4a formed in opposed relation to a control switch body (in the form of a non-contact switch) 31 attached to one light emission controller 26, said press member 48 being made of synthetic rubber, so that the protrusion hole 4a is reliably sealed.

Further, installed through another protrusion hole 4b and at the other side of the grip 3 associated with the head 6 is an operating protuberance 27 for an operating switch body (in the form of a non-contact switch) 45 attached to the other light emission controller 26, said operating protuberance 27 being made of synthetic rubber, thereby reliably sealing the protrusion hole 4b. In addition, said press member 48 and said operating protuberance 27 are disposed at positions which are deviated from each other longitudinally of the grip 3.

As shown in FIG. 1, the front end surface of said head 6 has embedded therein a plurality of (three, in the figure) small pillar-like magnets 21 spaced at predetermined intervals around the outer periphery thereof. The outer periphery of the head 6 has a hammer portion for breaking window glasses in a car, said hammer portion having attached thereto percussion imparting members 7 (made, for example, of hard alloy) protruding away from each other in the longer diameter direction A of the grip 3. And each percussion imparting member 7, as shown in FIG. 5, comprises an embedment portion 49 to be embedded in the head 6, and a tip 50 protruding outside the head 6. Further, the head 6 has a curved reflecting plates 51 housed therein for supporting said light bulb 19 and is formed with a support 18 for supporting the reflecting plate 51.

Figure 6:
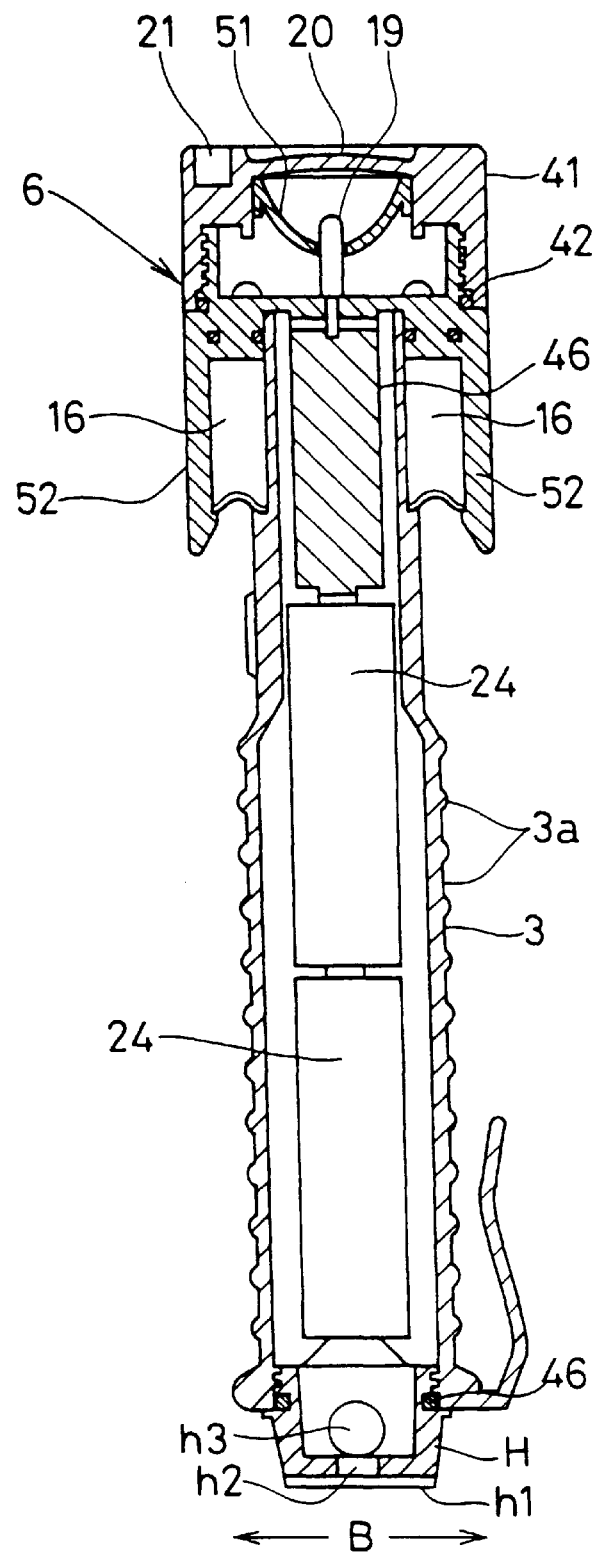
FIG. 6 is a central sectional view of said signal device in FIG. 4.

As shown in FIG. 6, the main body 2 is provided with a pair of cutters 16 for cutting a seat belt S (see FIG. 1) disposed in the shorter diameter direction B of the grip 3, in a region connecting the grip 3 and head 6, and through extension supports 52 which also serve as guides. The cutting edge of each cuter 16 is concavely curved toward the head 6, being what is called the U-shaped cutting edge.

Figure 8:
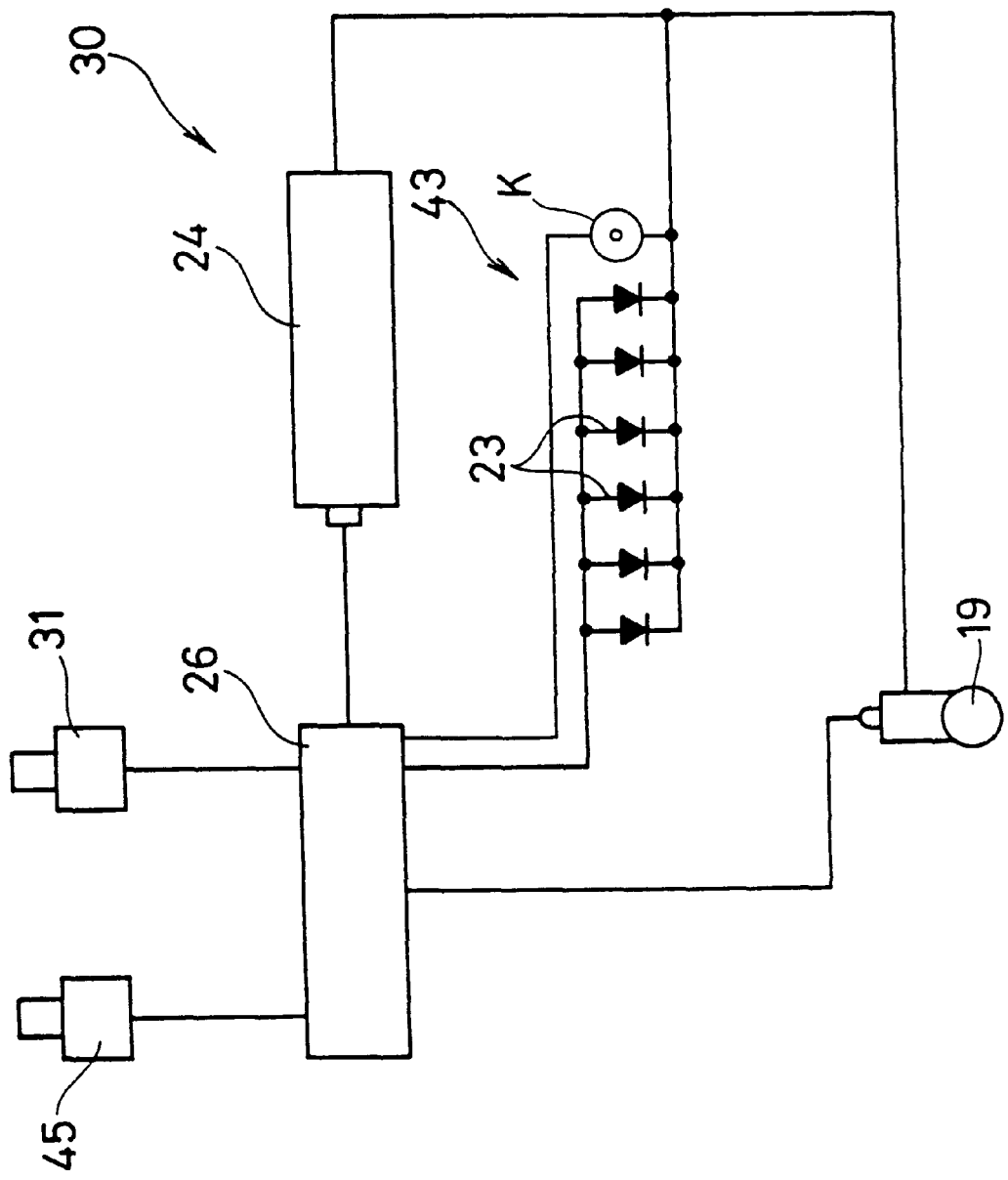
FIG. 8 is a diagram showing a light emitting circuit used in said signal device.

As shown in FIG. 8, there is a light emitting circuit 30 for controlling the emission of light from said light bulb 19 and LED group 43. In this light emitting circuit 30, said control switch body 31 and operating switch body 45 are connected to the input side of the light emission controller 26, while the light bulb 19, LED group 43 and the alarm buzzer K are connected to the output side.

In addition, the light emission controller 26 has a first function of sending a continuous flashing signal to each LED 23 and controlling the alarm buzzer K to sound an alarm on the first turn-on action on the operating switch body 45 effected by the operating protuberance 27 from the state in which the light emitting circuit 30 is off, that is, both the light bulb 19 and the LED group 43 are off, a second function of controlling the alarm buzzer K not to sound an alarm and sending a continuous flashing signal to each LED 23 on the second tarn-on action (the first turn-on action from the state of continuous flashing of the LEDs 23), a third function of sending an extinguishing signal to each LED and a lighting signal to the light bulb 19 on the third turn-on action, a fourth function of sending a continuous flashing signal to each LED 23 and a lighting signal to the light bulb 19 on the fourth turn-on action, a fifth function of sending an extinguishing signal to each LED 23 and to the light bulb 19 on the fifth turn-on action, a sixth function of sending a continuous flashing signal to each LED 23 and controlling the alarm buzzer K to sound an alarm when the control switch body 31 is turned off (or the main body 2 is released from the holder 29) after the control switch body 31 is turned on (or the main body 2 is mounted in the holder 29) irrespective of whether the light emitting circuit 30 is in the off-state or the LEDs 23 and light bulb 19 are in the flashing, lighting or extinguished state, and a seventh function of controlling the alarm buzzer K not to sound an alarm when the control switch body 31 is turned on again from this state.

When the hammer-equipped emergency signal device 1 arranged in the manner described above is installed in a car, it is positioned such that the press member 48 is pressed by the holder 29 provided in the car. With this positioning, the press member 48 is pressed by the holder 29 to turn off both the control switch body 31 and the light emitting circuit 30, so that the light bulb 19 and LEDs 23 both assume the extinguished state. Further, the alarm buzzer is turned off and no alarm is sounded.

Further, since the press member 48 and the operating protuberance 27 are disposed at positions deviated from each other longitudinally of the grip 3, the operating protuberance 27 (light emission controller 26) is not operated by the holder 29.

In this connection, if the car should collide with a wall or the like and the resulting shock causes the hammer-equipped emergency device 1 to come off the holder 29, then the pressing on the press member 48 is removed and therefore the control switch body 31, which has been turned off up to the present, is turned on, whereby the light emission controller 26 for the light emitting circuit 30 delivers an output to cause the LEDs 23 to continuously flash and the alarm buzzer K to sound an alarm, the red light flashing continuously. Since the grip 3 is transparent, the flashing light can be clearly seen, being discernible even from outside the car. Especially at night, the flashing of the LEDs 23 is very noticeable even from a distance, making it possible to report to other people that an emergency has occurred.

In addition, since the alarm buzzer is turned on to sound an alarm, emergency can be reported more reliably and securely.

Further, the LEDs 23 start to flash repeatedly and an alarm is sounded when the hammer-equipped emergency signal device 1 is detached from the holder 29. Thus, if the car stalls as in a crossing, the driver may detach the hammer-equipped emergency device 1 from the holder 29 and carry it out of the car to report the emergency to an approaching train.

Further, removing the hammer-equipped emergency signal device 1 from the holder 29 (whereupon the LEDs 23 continuously flash and the alarm buzzer K sounds an alarm)

and turning on the operating switch 45 by operating the operating protuberance 27 once will stop the alarm sound and cause the LEDs 23 to continuously flash. In addition, turning on the operation switch body 45 by operating the operating protuberance 27 will stop the continuous flashing of the LEDs 23 and turn on the light bulb 19 alone, so that the device of the present invention can also be used as a common flashlight. Of course, the LEDs 23 can be made to continuously flash and the light bulb 19 can be turned on and off by subsequently turning on the switch body 45.

In this connection, in cases where a traffic accident or the like compels the driver and passengers to evacuate the car but the doors of the car will not open, the person may remove the hammer-equipped signal device 1 from the holder 29, grip the grip 3 of the main body 2, and strike the window glass with the percussion imparting member 7 of a hammer body 8, thereby breaking the window glass. In this manner, the driver and passengers can evacuate the car.

Further, in cases where a traffic accident or the like occurs and the seat belt S mounted around the driver or a passenger cannot be released, he may grip the grip 3 of the hammer-equipped emergency signal device 1 with its head 6 down and hold that portion of the seat belt S between the extension support 52 and the main body 2 at which to cut the seat belt, thereby cutting the seat belt with the cutter 16. The cutter 16 is a U-shaped cutter, which means that the cutting of the seat belt S is very easy.

Considered from the above, it is desirable that the hammer-equipped emergency signal device 1 be installed at a place which is readily accessible to both the driver and the passengers.

In cases where a trouble or the like occurring in the car at night compels the driver to stop the car along the shoulder of the road for repairing work, he may remove the hammer-equipped emergency signal device 1 from the holder 29 (whereupon, as described above, the LEDs 23 continuously flash and the alarm buzzer K sounds an alarm, but it may be operated so that no alarm is sounded), carry it out of the car, and place it anywhere on the car body (for example, on the trunk door surface) with the head 6 down. Since the head 6 has the magnets 21 attached thereto, even if the hammer-equipped emergency signal device 1 is placed on the car body with its head 6 down in this manner, the hammer-equipped emergency signal device 1 is firmly magnetically stuck to the car body, such state being maintained, thus making it possible, in a conspicuous place, to report to succeeding cars that a car is stopping along the shoulder. The warning horn used also as the lid member H is used as occasion arises.

Further, since the hammer-equipped emergency signal device 1 has both the function of an emergency signal article and the function of a hammer, there is no need to install both emergency signal equipment and a hammer as in the prior art; therefore, it is sufficient to install a single holder 29 in a car, there being no need to prepare installation spaces for additional holders.

Figure 9:
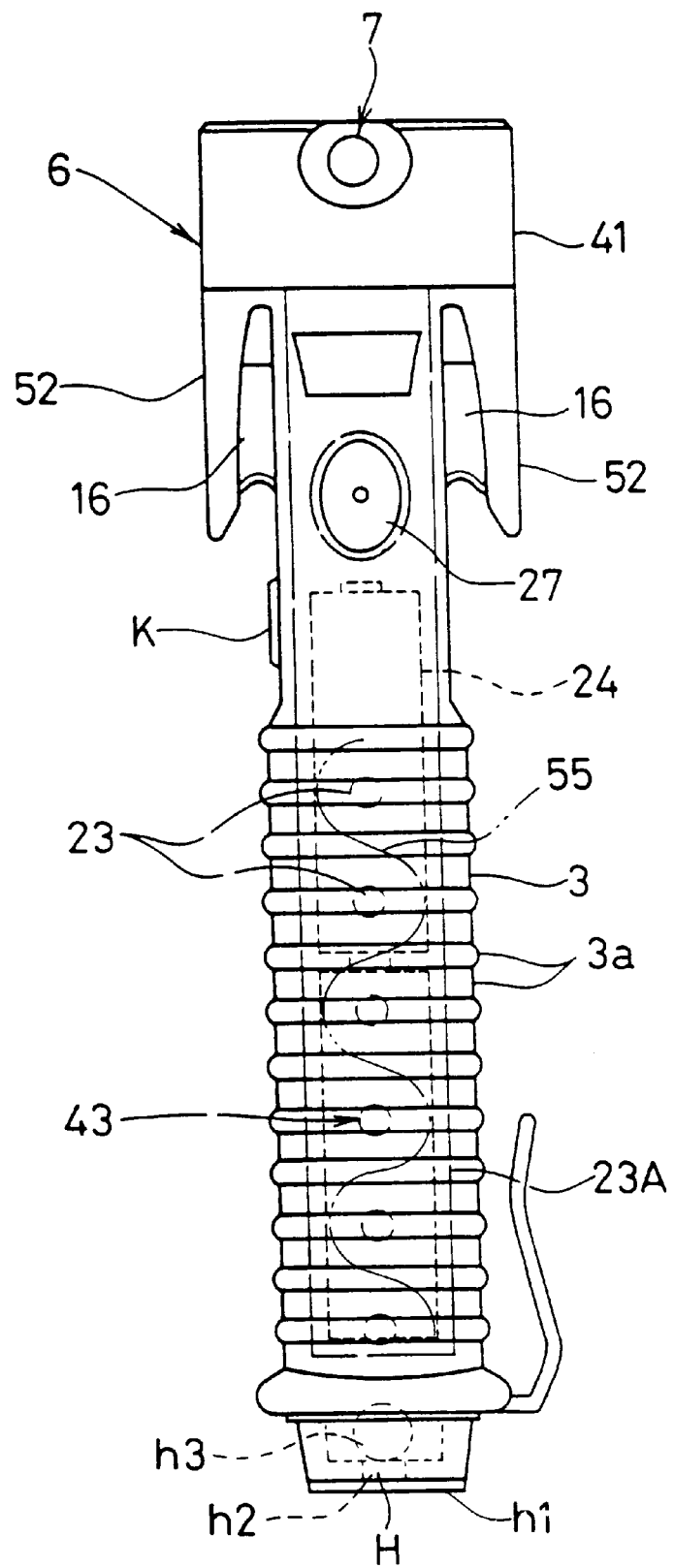
FIG. 9 is an overall front view of a hammer-equipped emergency signal device according to a second embodiment of the present invention.
Figure 10:
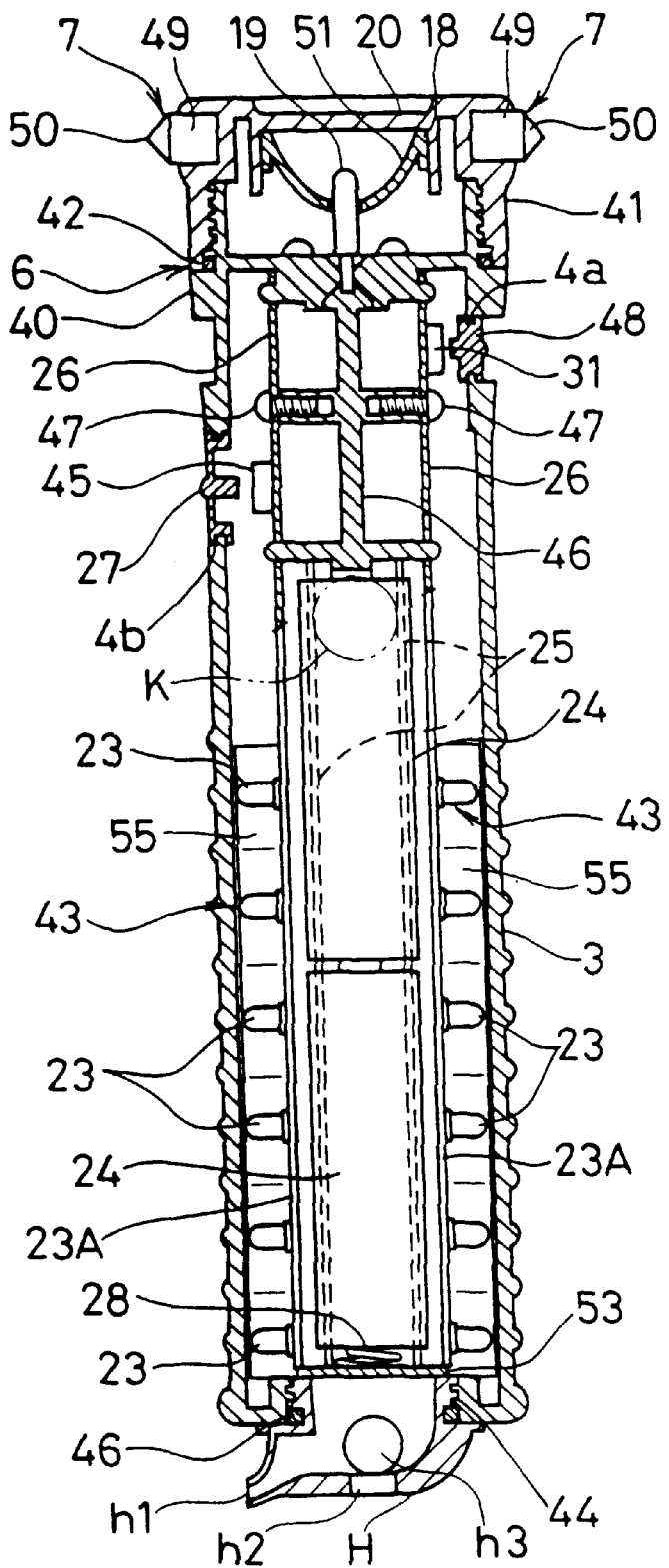
FIG. 10 is an overall side view of said signal device.

Next, a second embodiment of the invention will be described with reference to FIGS. 9 and 10. In a hammer-equipped emergency signal device of the embodiment of the invention, a reflecting member 55 is housed in the grip 3, whereby the warning light emitted from the LEDs 23 is reflected in the shorter diameter direction B of the grip 3, said reflecting member 55 being continuously curved in one direction and then in the other for the individual corresponding LEDs 23; thus, it is in a wave form as seen in a front view. Further, this reflecting member 55 has a height (from the base plate 23A to the inner peripheral surface of the grip 3 in the longer diameter direction A) which exceeds the light emitting portions of the heads of the LEDs 23, it being made, for example, by applying aluminum vapor deposition to a thin synthetic resin plate. The rest of the arrangement is the same as in the first embodiment described above and a description thereof is omitted.

In the above arrangement, when the LEDs 23 are flashing or lighting, the reflecting member 55 having aluminum vapor deposition applied thereto performs the function of a reflecting mirror, whereby the warning light from each LED 23 is reflected in the shorter diameter direction B of the grip 3 Further, since the grip 3 is transparent, the warning light from each LED 23 is clearly visible in both of the longer and shorter diameter directions A and B of the grip 3, that is, in the 360° omni-direction. Particularly in the case where such reflecting member 55 is provided, the ridges in the irregularities 3a perform the function of lenses, making the warning light more conspicuous. The rest of the functions and effects are the same as in the first embodiment described previously, so that a description thereof is omitted. In addition, in this embodiment, the reflecting member 55 is continuously curved in one direction and then in the other for the individual corresponding LEDs 23; thus, it is in a wave form as seen in a front view. However, it is not limited thereto, and the reflecting member 55 may be intermittently curved for the individual corresponding LEDs 23.

Further, the reflecting member 55 may be integrally formed on the grip 3 or may, of course, be separately formed.

Next, a third embodiment of the invention will be described with reference to FIGS. 11 through 17. A hammer-equipped emergency signal device 1 according to the third embodiment of the invention has a hollow main body 2 which is composed of split halves 4 which are separable in the longer diameter direction A of the grip 3 which is substantially elliptic in cross section and which has irregularities 3a formed on its surface. The split halves 4 can be assembled together by being put together using bolts and nuts 5a, 5b, provided with said grip 3, and a head 6 of circular cross section which is continuous with the grip 3 and gradually enlarged.

The grip 3 is made of colored light-permeable material (for example, travel-reflective resin) and has a fluorescent material applied to the inner surface thereof.

The head 6 has a hammer body 8 (formed, for example, of hard alloy) for breaking car window glasses, attached thereto somewhere between the ends thereof, said hammer body 8 protruding in the longer diameter direction A of the grip 3 and having a pointed percussion imparting member 7. The hammer body 8 is provided with an annulus 9 supported internally of the head 6 of the main body 2, said hammer body 8 being made up of a combination of segments 10 which are split in the same direction as in the main body 2.

And each segment 10 has a joining piece 12 to be joined to a joined surface 11 formed on a portion of the percussion imparting member 7 of the mating segment 10. The hammer body 8 is held between said split halves 4 with each joining piece 12 contacted with the associated joined surface 11. The joining pieces 12 and joined surfaces 11 are formed with insertion holes 13 for insertion of bolts 5a therethrough.

When this hammer body 8 is assembly by joining together the split halves 4 constituting the main body 2 by bolts and nuts 5a, 5b, the split halves 4 are integrated with the main body 2 by the bolts 5a inserted through the insertion holes 13. In addition, the main body 2 is formed with protrusion holes 14 through which the percussion imparting members 7 of the hammer body 8 protrude.

Further, each percussion imparting member 7 is covered with a cover 15 of synthetic rubber, said cover 15 being formed at its front end with a hole 15a through which the front end of the percussion imparting member 7 is slightly exposed.

Protruding in the shorter diameter direction B of the grip 3, cutters 16 for cutting the seat belt S are provided somewhere between the ends of the head 6. Outside the cutters 16, guides 17 whose surface has the same curvature as the head 6 and whose inner surface is flat are formed, depending toward the grip 3.

Figure 14:
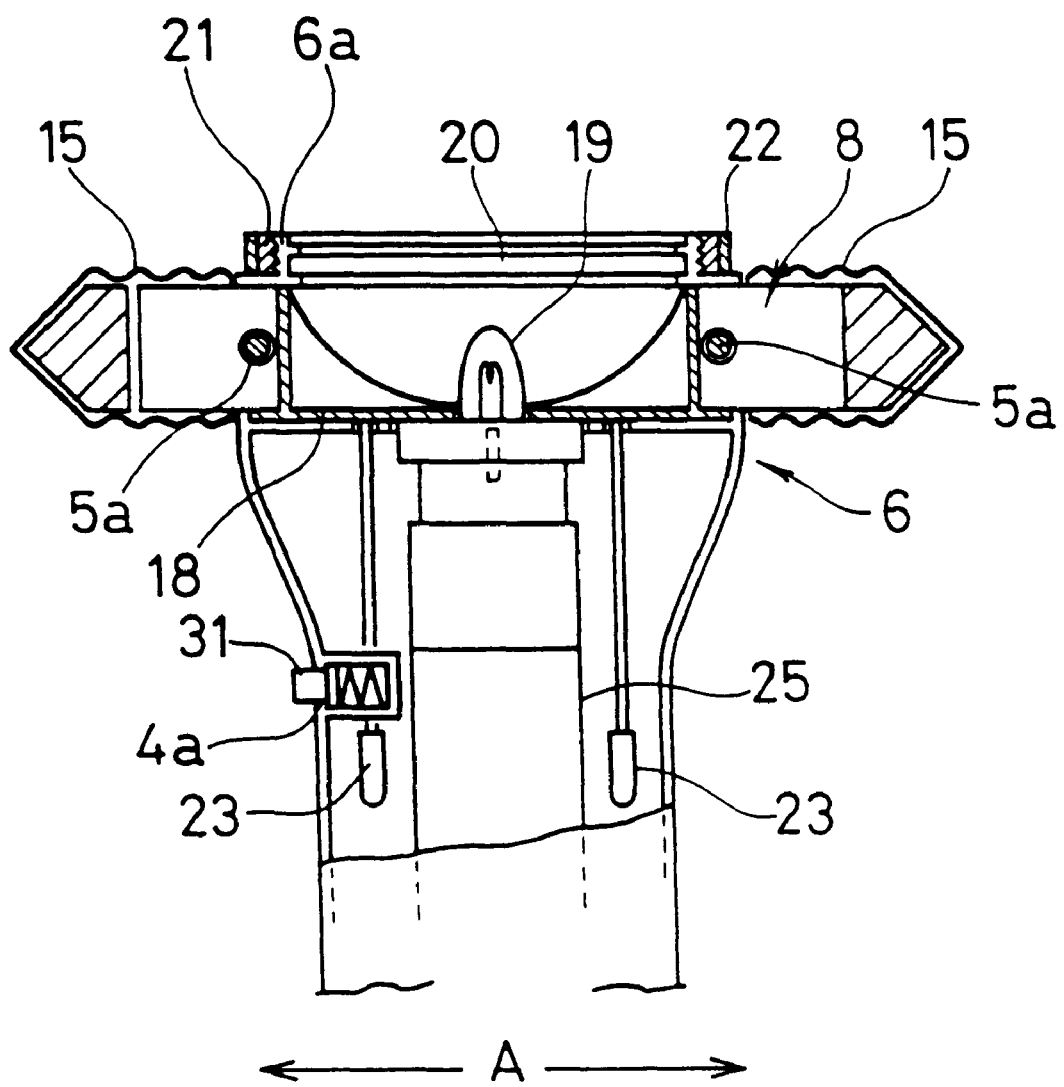
FIG. 14 is a sectional view taken along the line X—X in FIG. 11.
Figure 15:
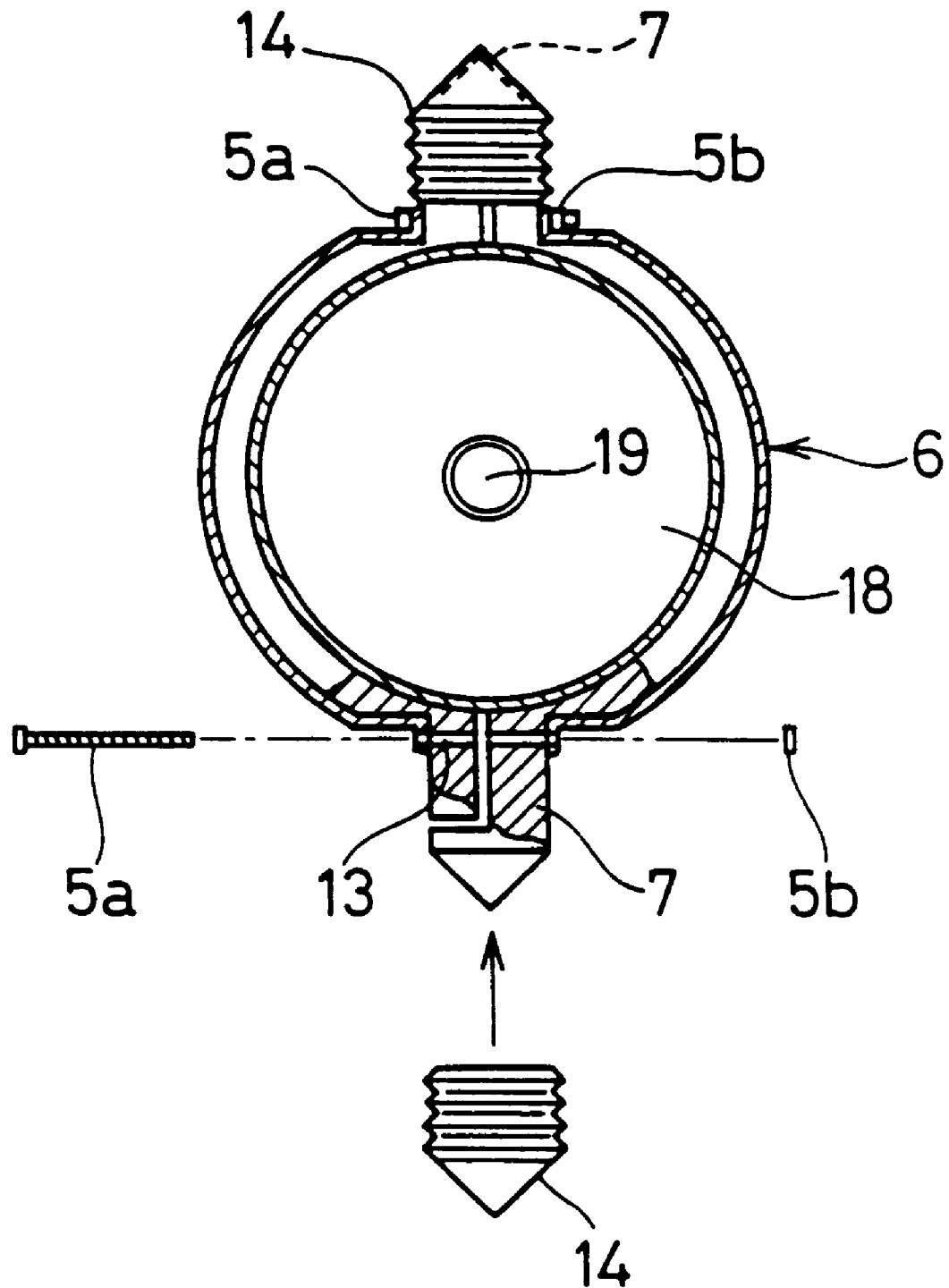
FIG. 15 is a sectional view taken along the line Y—Y in FIG. 11.

As shown in the sectional views of FIGS. 14 and 15, a light bulb (an example of a second light emitting body) 19 supported by a reflector-equipped support 18 protrudes from the middle of the annulus 9 of the hammer body 8 to the opposite side of the grip 3, and an annular protuberance 6a formed on the front end of the head 6 has fitted therein a glass disk 20 permeable to light emitted from the light bulb 19.

Further, the protuberance 6a has an annular magnet 21 threadedly fitted thereon, said magnet 21 has a metal ring 22 fitted thereon.

Figure 12:
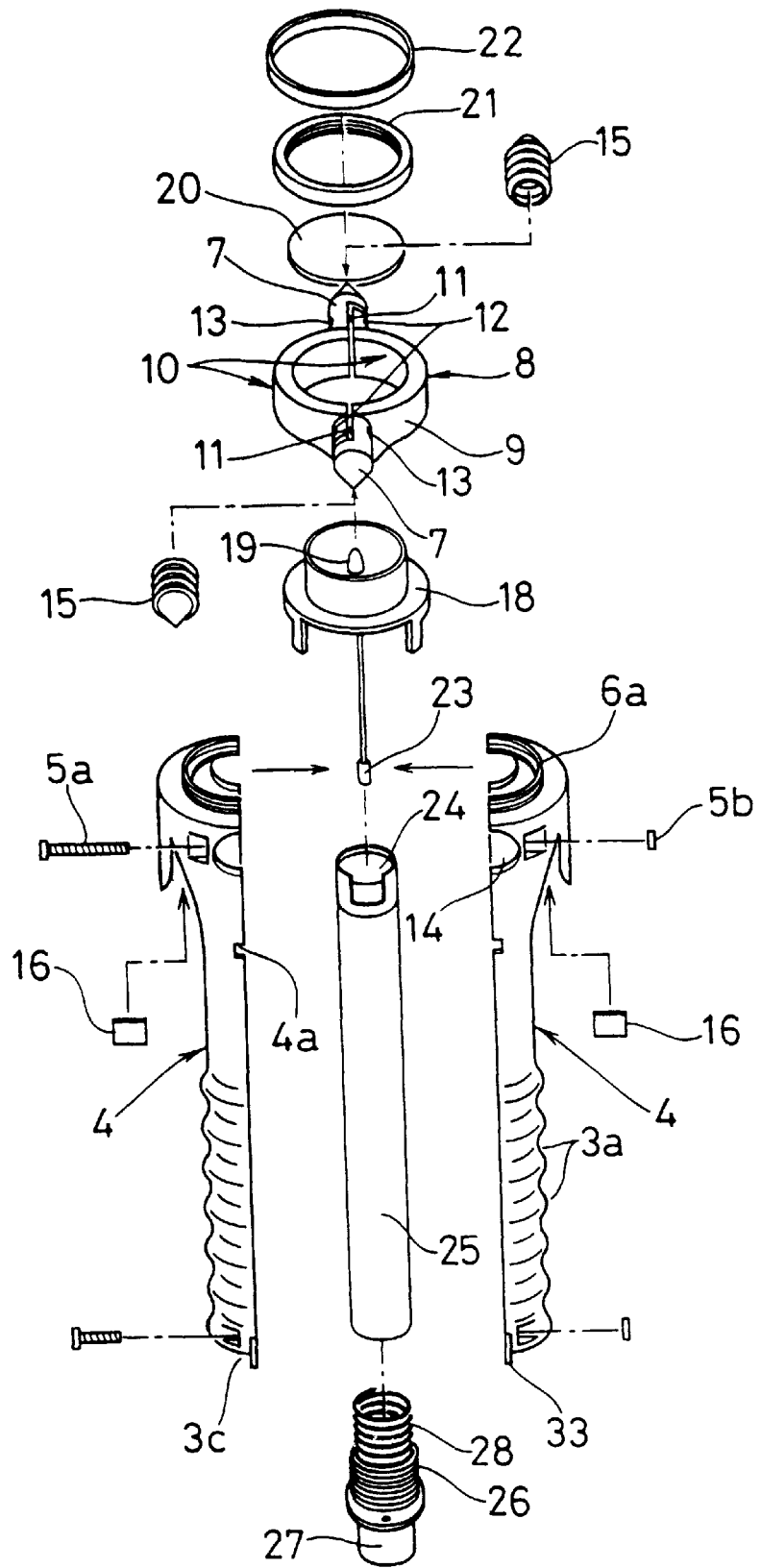
FIG. 12 is an exploded perspective view of said signal device.
Figure 13:
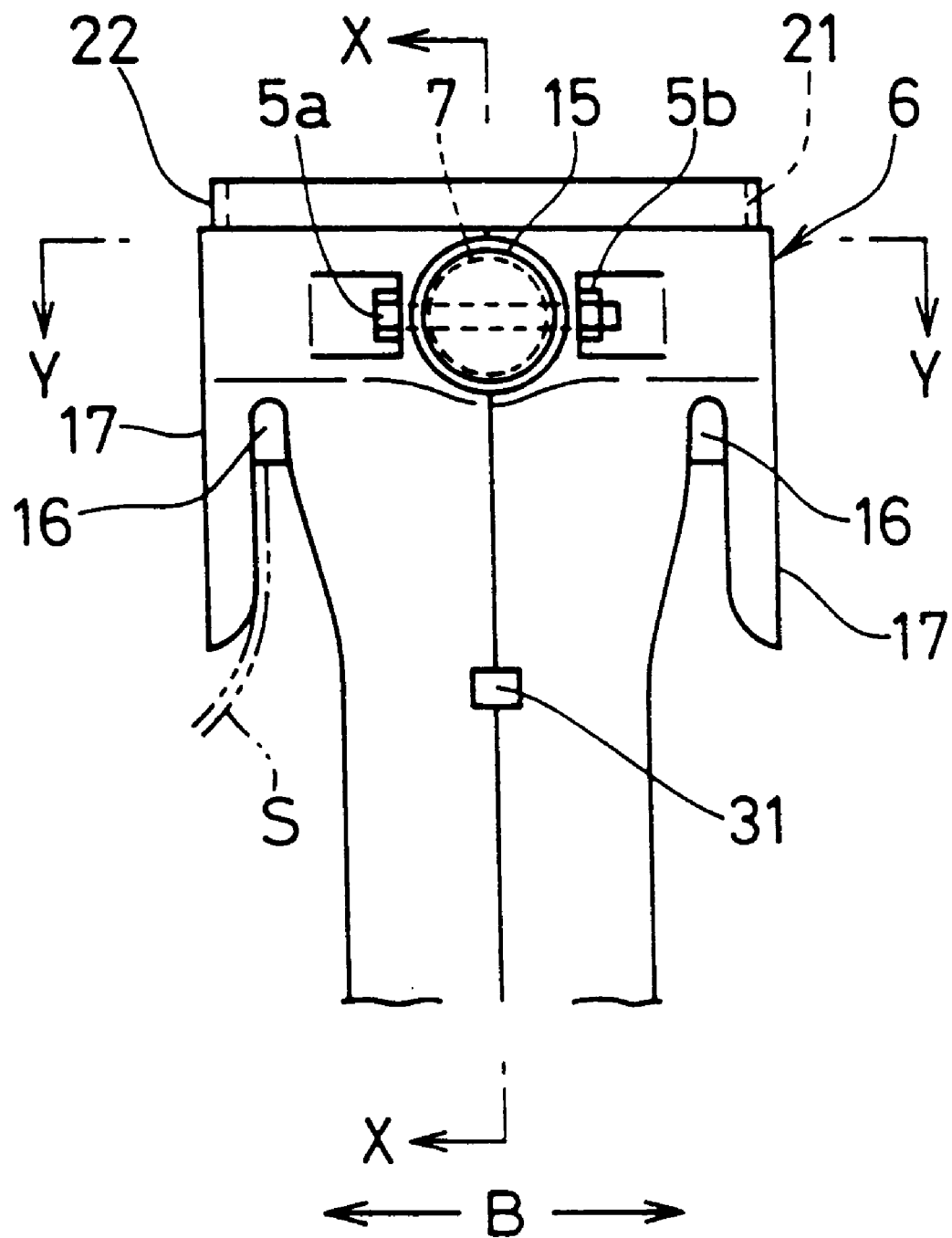
FIG. 13 is an enlarged front view of the head of said signal device.

At the side of the grip 3 associated with the head 6, LEDs (an example of a first light emitting body) 23 which emit warning light directed from the inner surface of the grip 3 and through the grip 3 are spaced from each there in the longer diameter direction A of the grip 3, and, as shown in FIG. 12, the grip 3 has a battery case 25 housed therein for holding a battery 24 connected in series. At the base surface of the grip 3, an operating protuberance 27 for a light emission controller 26 for controlling the emission of light from the light bulb 19 and LEDs 23 is threadedly fitted in a protrusion hole 3c, said light emission controller 26 being connected to the batteries 24 through a spring 28.

Figure 16:
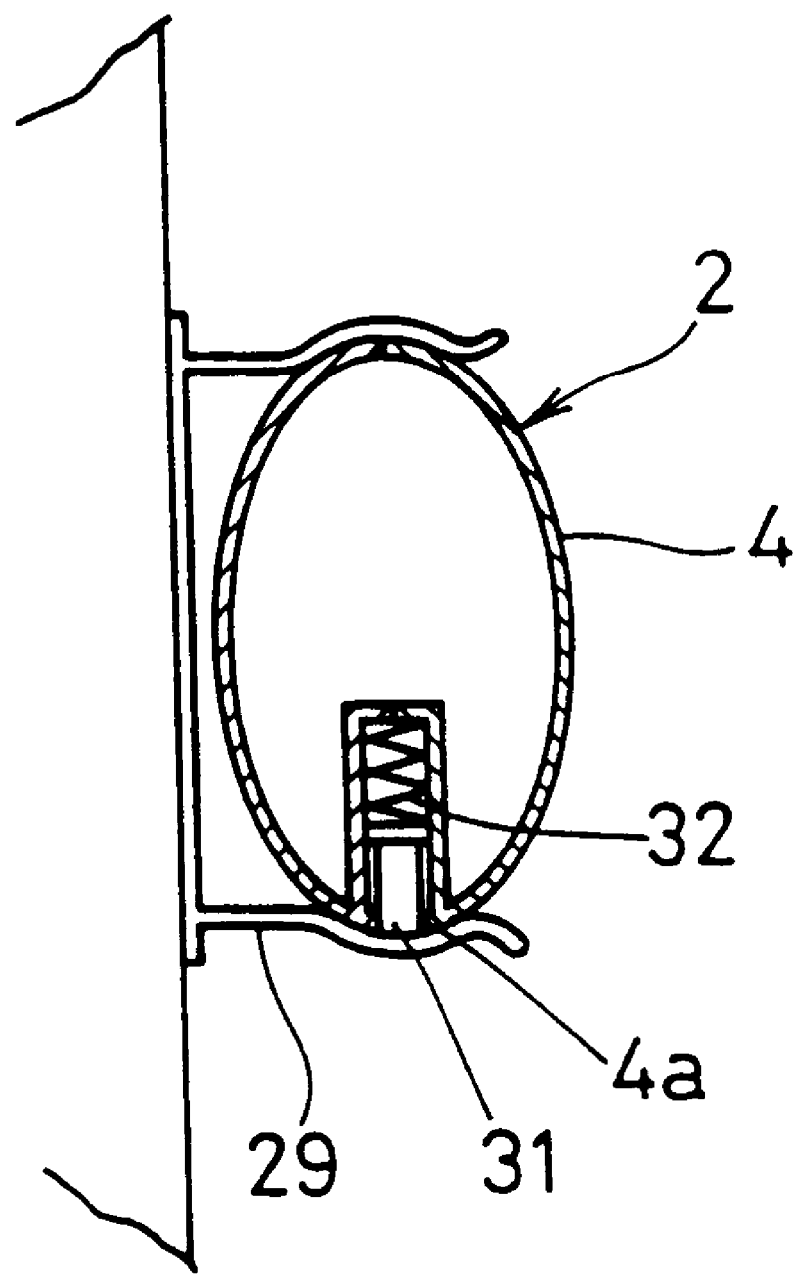
FIG. 16 is a schematic sectional view of said signal device installed on a holder.

As shown in FIG. 16, a control switch body 31 which turns off a light emitting circuit 30 to be later described on placement of the main body 2 in a holder 29 installed in a car and which turns on said light emitting circuit 30 on removal of the main body 2 from the holder 29 is installed in the grip 3 through another protrusion hole 4a, said control switch body 31 being urged by a spring 32 in the direction in which it protrudes from the grip 3.

Figure 17:
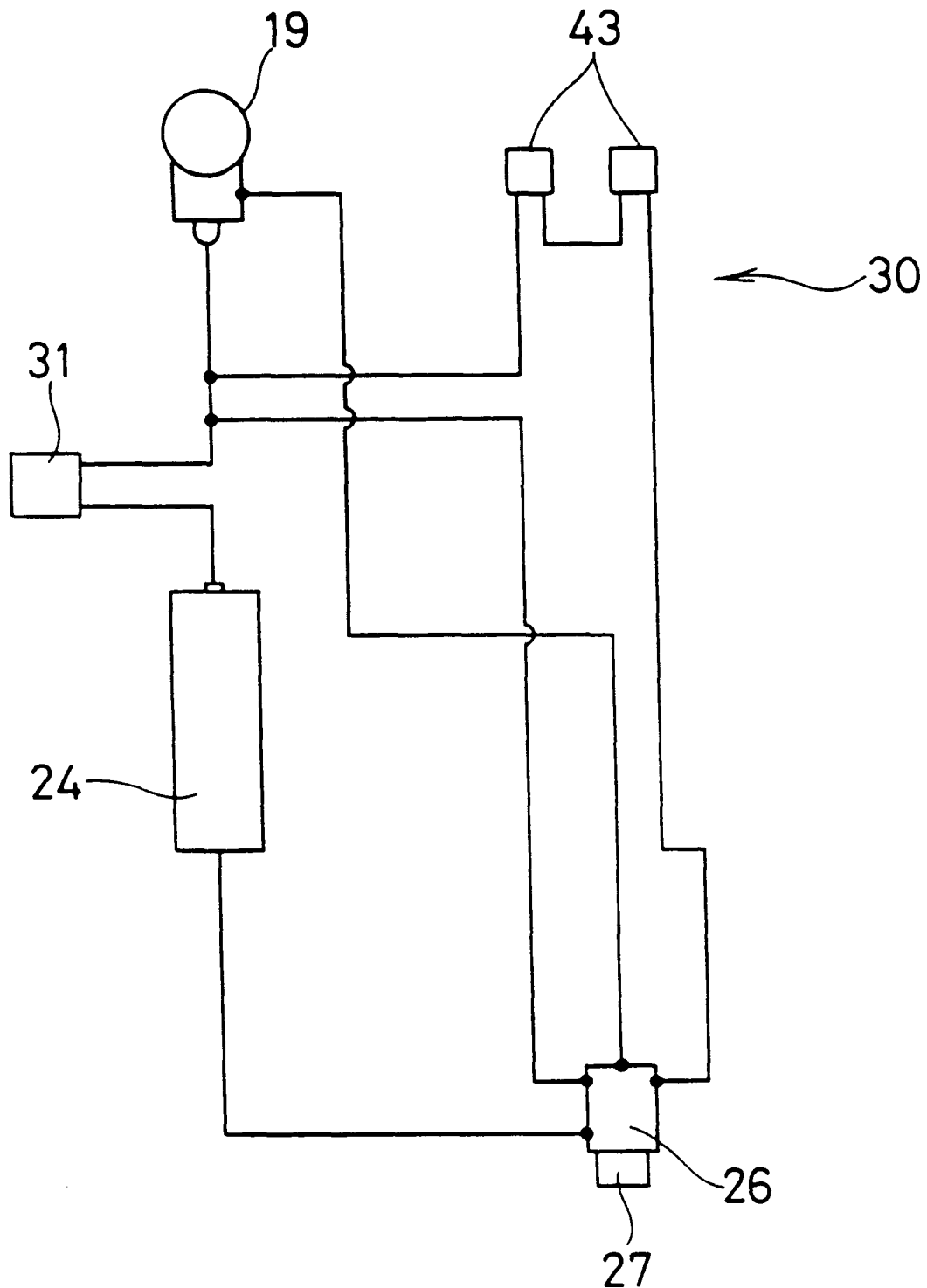
FIG. 17 is a diagram showing a light emitting circuit used in said signal device.

As shown in FIG. 17, there is provided said light emitting circuit 30 which causes the light bulb 19 and LEDs 23 to emit light. The light emitting circuit 30 comprises said batteries 24, control switch body 31, and light emission controller 26, said control switch body 31 being connected between one end of the battery 24 and the light bulb 19, the other end of the battery 24 being connected to the light emission controller 26, the other end of the light bulb 19 being connected to the light emission controller 26, the LEDs 23 being connected between the control witch 21 and the light emission controller 26.

And said light emission controller 26 has a first function of sending a lighting signal to the light bulb 19 on the first pressing on the operating protuberance 27, a second function of sending a lighting signal to the light bulb 19 while sending a flashing signal to the LEDs 23 on the second pressing on the operating protuberance, a third function of sending an extinguishing signal to the light bulb 19 while sending a flashing signal to the LEDs 23 on the third pressing, and a fourth function of sending an extinguishing signal to the light bulb 19 and to the LEDs 23 on the fourth pressing.

Figure 11:
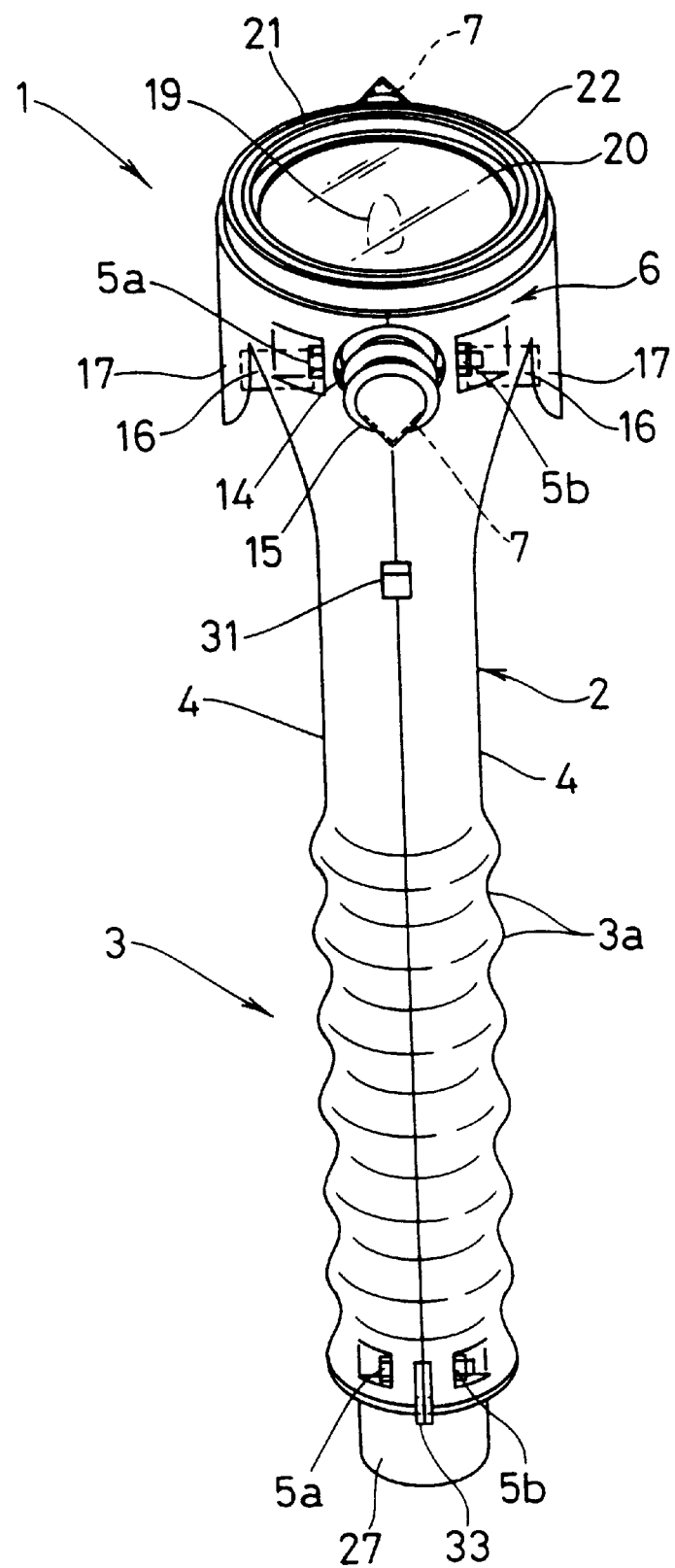
FIG. 11 is an overall perspective view of a hammer-equipped emergency signal device according to a third embodiment of the present invention.

In addition, the numeral 33 in FIGS. 11 and 12 denotes a protuberance with a lock insertion hole, which protuberance, as in the case where it is desired to use the present inventive device as a domestic fixture, is used to lock said device in a predetermined place in the home.

As is understood from the arrangement described above, the greater part of the weight of this hammer-equipped emergency signal device 1 is concentrated on the side associated with the head 6.

When the user desires to install the hammer-equipped emergency signal device 1 of said arrangement in a car, first he presses the operating protuberance 27 for the light emission controller 26 a predetermined number of times to choose to light the light bulb 19 alone, to light the light bulb 19 and flash the LEDs 23, to turn off the light bulb 19 and flash the LEDs 23, or to turn off the light bulb 19 and LEDs 23.

Then he places it in the holder 29 installed in the car by positioning it such that the control switch body 31 is pressed by the holder 29. With this done, the holder 29 presses the control switch body 31 against the force of the spring 32, turning off the light emitting circuit 30, with both the light bulb 19 and the LEDs 23 turned off.

However, when the car collides with a wall or the like with the resulting shock forcing the hammer-equipped emergency signal device 1 to come off the holder 29, the control switch body 31 is pressed by the spring 32 to turn on the light emitting circuit 30, so that, for example, the LEDs 23 alone start to flash, the flashing of a red color, for example, being continued. Particularly at night, the flashing of the LEDs 23 can be seen well from a distance, making it possible to report to others that an emergency has happened in this place.

Further, even if the car stalls as in a railroad crossing, the driver may get out of the car to flash the LEDs 23, whereby he can, of course, report the accident to an approaching train. Further, the driver may operate the operating protuberance 27 to turn on the light bulb 19, so that he can use it in place of a flashlight.

In cases where a traffic accident or the like compels the driver and passengers to evacuate the car but the doors of the car will not open, the driver may remove the hammer-equipped emergency signal device 1 from the holder 29, grip the grip 3 of the main body 2, and strike the window glass with the percussion imparting member 7 of the hammer body 8, thereby breaking the window glass. By so doing, the driver and passengers can evacuate the car through the window.

Further, in cases where a traffic accident or the like occurs and the seat belt mounted around the driver or a passenger cannot be released, he may grip the grip of the hammer-equipped emergency signal device 1 with its head down and hold that portion of the seat belt S between the guide 17 and the head 6 at which to cut the seat belt, thereby cutting the seat belt with the cutter 16. Therefore, it is desirable that the hammer-equipped emergency signal device 1 be installed at a place which is readily accessible to both the driver and the passengers.

Further, in cases where a trouble or the like occurring in the car at night compels the driver to stop the car along the shoulder of the road for repairing work, he may remove the hammer-equipped emergency signal device 1 from the holder 29, carry it out of the car, and place it anywhere on the car body (for example, on the trunk door surface) with the head 6 down. Since the head 6 has the magnet 21 attached to the protuberance 6a thereof and the metal annulus 22 is fitted on the magnet 21, even if the hammer-equipped emergency signal device 1 is placed on the car body with its head 6 down in this manner, the hammer-equipped emergency signal device 1 is firmly stuck to the car body and held in such state. Thus, it is possible, in a conspicuous place, to report to succeeding cars that a car is stopping along the shoulder.

Further, since the hammer-equipped emergency signal device 1 has both the function of emergency signal equipment and the function of a hammer, there is no need to mount both of emergency signal equipment and a hammer as in the prior art; therefore, it is sufficient to install a single holder 29 in a car, there being no need to prepare spaces for installation of additional holders.

Although not shown in the drawings, the hammer-equipped emergency signal device of this third embodiment may be provided with an alarm buzzer K of the same configuration as those in the first and second embodiments.

In addition, in each embodiment described above, the hammer-equipped emergency signal device 1 has been described as arranged such that it uses a dry cell as a power source and is simply mounted in a holder 29 installed in a car; however, the invention is not limited to this arrangement. Thus, it may use a rechargeable battery as a power source, so that when it is mounted in the holder 29, the car battery and the power source are electrically connected together and the power source is charged with electric energy while the car engine is driven.

INDUSTRIAL APPLICABILITY

As has been described so far, the hammer-equipped emergency signal device according to the present invention is suitable for emergency use as mounted in a car.

What is claimed is:

1. A hammer-equipped emergency signal device comprising:
   a hollow main body which has a grip having an elliptic cross section and an enlarged head having a circular cross section continuous with said grip;
   at least the grip of said main body being made of light-permeable material;
   a first light emitting body housed in said grip for emitting warning light from within and through said grip;
   a second light emitting body housed in said head for emitting warning light through a disk-like light-permeable plate disposed in the front end of the head;
   a light emitting circuit housed in said main body and equipped with a light emission controller for controlling the emission of light from said first and second light emitting bodies and a battery disposed in the grip;
   a control switch body disposed in said main body and adapted to turn off or on said light emitting circuit when the main body is placed in or removed from a holder provided in a car;
   magnets disposed around the outer periphery of the front end surface of said head;
   the outer periphery of said head serving as a hammer portion for breaking glass in a car;
   said hammer portion having a percussion imparting member attached thereto and protruding in the longer diameter direction of the grip; and
   a cutter for cutting a seat belt, disposed at a position continuous with said grip and head and extending in the shorter diameter direction of the grip.

2. A hammer-equipped emergency signal device as set forth in claim 1 wherein the main body includes an alarm buzzer for sounding an alarm in accordance with the operation of the control switch body.

3. A hammer-equipped emergency signal device as set forth in claim 1 wherein the grip houses a reflecting member for reflecting the warning light emitted from the first light emitting body in the shorter diameter direction of the grip.

4. A hammer-equipped emergency signal device as set forth in claim 3 wherein the main body includes an alarm buzzer for sounding an alarm in accordance with the operation of the control switch body.

5. A hammer-equipped emergency signal device as set forth in claim 1 wherein the color of the light emitted from the first light emitting body is red.

6. A hammer-equipped emergency signal device as set forth in claim 2 wherein the color of the light emitted from the first light emitting body is red.

7. A hammer-equipped emergency signal device as set forth in claim 3 wherein the color of the light emitted from the first light emitting body is red.

8. A hammer-equipped emergency signal device as set forth in claim 4 wherein the color of the light emitted from the first light emitting body is red.

9. A hammer-equipped emergency signal device as set forth in claim 1 wherein the cutting edge of the cutter is curved such that it is recessed toward the head.

10. A hammer-equipped emergency signal device as set forth in claim 2 wherein the cutting edge of the cutter is curved such that it is recessed toward the head.

11. A hammer-equipped emergency signal device as set forth in claim 3 wherein the cutting edge of the cutter is curved such that it is recessed toward the head.

12. A hammer-equipped emergency signal device as set forth in claim 4 wherein the cutting edge of the cutter is curved such that it is recessed toward the head.

13. A hammer-equipped emergency signal device as set forth in claim 5 wherein the cutting edge of the cutter is curved such that it is recessed toward the head.

14. A hammer-equipped emergency signal device as set forth in claim 6 wherein the cutting edge of the cutter is curved such that it is recessed toward the head.

15. A hammer-equipped emergency signal device as set forth in claim 7 wherein the cutting edge of the cutter is curved such that it is recessed toward the head.

16. A hammer-equipped emergency signal device as set forth in claim 8 wherein the cutting edge of the cutter is curved such that it is recessed toward the head.

17. A hammer-equipped emergency signal device comprising:
    a hollow main body which has a grip having an elliptic cross section and an enlarged head having a circular cross section continuous with said grip;
    at least the grip of said main body being made of light-permeable material;
    first light emitting bodies housed in said grip at predetermined intervals longitudinally of the grip for emitting warning light from within and through said grip;
    a second light emitting body housed in said head for emitting warning light through a disk-like light-permeable plate disposed in the front end of the head;
    a light emitting circuit housed in said main body and equipped with a light emission controller for controlling the emission of light from said first and second light emitting bodies and a battery disposed in the grip;
    a control switch body disposed in said main body and adapted to turn off or on said light emitting circuit when the main body is placed in or removed from a holder provided in the car;

magnets disposed around the outer periphery of the front end surface of said head;

the outer periphery of said head serving as a hammer portion for breaking glass in the car;

said hammer portion having attached thereto a percussion imparting member protruding in the longer diameter direction of the grip; and a cutter for cutting a seat belt, disposed at a position continuous with said grip and head and extending in the shorter diameter direction of the grip.

18. A hammer-equipped emergency signal device as set forth in claim 17 wherein the main body includes an alarm buzzer for sounding an alarm in accordance with the operation of the control switch body.

19. A hammer-equipped emergency signal device as set forth in any of claims 1 through 18 wherein the main body includes a whistle.

20. A hammer-equipped emergency signal device as set forth in claim 17 wherein the grip houses a reflecting member for reflecting the warning light emitted from the first light emitting body in the shorter diameter direction of the grip.

21. A hammer-equipped emergency signal device as set forth in claim 20 wherein the main body includes an alarm buzzer for sounding an alarm in accordance with the operation of the control switch body.

22. A hammer-equipped emergency signal device as set forth in claim 17 wherein the color of the light emitted from the first light emitting body is red.

23. A hammer-equipped emergency signal device as set forth in claim 18 wherein the color of the light emitted from the first light emitting body is red.

24. A hammer-equipped emergency signal device as set forth in claim 20 wherein the color of the light emitted from the first light emitting body is red.

25. A hammer-equipped emergency signal device as set forth in claim 21 wherein the color of the light emitted from the first light emitting body is red.

26. A hammer-equipped emergency signal device as set forth in claim 17 wherein the cutting edge of the cutter is curved such that it is recessed toward the head.

27. A hammer-equipped emergency signal device as set forth in claim 18 wherein the cutting edge of the cutter is curved such that it is recessed toward the head.

28. A hammer-equipped emergency signal device as set forth in claim 20 wherein the cutting edge of the cutter is curved such that it is recessed toward the head.

29. A hammer-equipped emergency signal device as set forth in claim 21 wherein the cutting edge of the cutter is curved such that it is recessed toward the head.

30. A hammer-equipped emergency signal device as set forth in claim 22 wherein the cutting edge of the cutter is curved such that it is recessed toward the head.

31. A hammer-equipped emergency signal device as set forth in claim 23 wherein the cutting edge of the cutter is curved such that it is recessed toward the head.

32. A hammer-equipped emergency signal device as set forth in claim 24 wherein the cutting edge of the cutter is curved such that it is recessed toward the head.

33. A hammer-equipped emergency signal device as set forth in claim 25 wherein the cutting edge of the cutter is curved such that it is recessed toward the head.

34. A hammer-equipped emergency signal device comprising:

a hollow rain body which has a grip having an elliptic cross section and an enlarged head having a circular cross section continuous with said grip;

said main body being made of colored light-permeable material;

a first light emitting body for emitting warning light from within and through said grip;

a second light emitting body for emitting warning light through a glass disk disposed in the front end of the head;

said first and second light emitting bodies being housed in said main body on the side associated with the head;

a light emitting circuit housed in said main body and equipped with a light emission controller for controlling the emission of light from said first and second light emitting bodies and a battery disposed in the grip;

a control switch body disposed in said grip to protrude therefrom and adapted to turn off or on a light emitting circuit when the main body is placed in or removed from a holder provided in a car;

an annular magnet attached along the outer periphery of the front end of said head;

a hammer body attached somewhere between the ends of the head and having a percussion imparting member protruding in the longer diameter direction of the grip for breaking a window glass in a car; and a cutter for cutting a seat belt, disposed somewhere between the ends of the head to extend in the shorter diameter direction of the grip.

35. A hammer-equipped emergency signal device as set forth in claim 34 wherein the main body is composed of a split body which can be split into two halves in the longer diameter direction of the grip, while the hammer body is composed of mutually complementary segments in the form of an annular member and a percussion imparting member which are disposed in the head of the main body, said segments being split in the same direction as said main body, each segment having a joining piece for joining to the joining surface of the adjoining segment, the arrangement being such that the hammer body is held between the two halves of the split body with said joining surfaces put together.

36. A hammer-equipped emergency signal device as set forth in claim 34 or 35 wherein a protective cover is attached to the percussion imparting member.

37. A hammer-equipped emergency signal device as set forth in claim 34 wherein the cutting edge of the cutter is curved such that it is recessed toward the head.

38. A hammer-equipped emergency signal device as set forth in claim 35 wherein the cutting edge of the cutter is curved such that it is recessed toward the head.

39. A hammer-equipped emergency signal device as set forth in claim 36 wherein the cutting edge of the cutter is curved such that it is recessed toward the head.

* * * * *